UNITED STATES PATENT OFFICE.

CLARENCE A. HALL, OF MOUNT AIRY, PENNSYLVANIA, ASSIGNOR TO PENNSYLVANIA SALT MANUFACTURING COMPANY, OF PHILADELPHIA, PENNSYLVANIA, A CORPORATION OF PENNSYLVANIA.

RECOVERY OF VALUES FROM THE LEACH-WATER OF COPPER EXTRACTION.

1,112,608.  Specification of Letters Patent.  Patented Oct. 6, 1914.

No Drawing.  Application filed October 14, 1912.  Serial No. 725,627.

*To all whom it may concern:*

Be it known that I, CLARENCE A. HALL, a citizen of the United States, and a resident of Mount Airy, in the county of Philadelphia and State of Pennsylvania, have invented certain new and useful Improvements in the Recovery of Values from the Leach-Water of Copper Extraction, of which the following is a specification.

Copper is recovered from cinders—*i. e.,* roasted cupreous pyrites which have been subjected to a chloridizing roasting by successive leachings with water, from which leachings the copper is precipitated. The water from which the copper has been precipitated is known as waste liquor and in fact is a waste product although it contains considerable value, such as zinc and sodium, in combinations as salts thereof.

It is the object of the present invention first to recover values from this so-called waste liquor and second to recover these values appropriately separated from each other.

To these and other ends hereinafter set forth the invention stated in general terms comprises the process of recovering values, such as zinc chlorid, sodium chlorid and sodium sulfate, from the waste leach water from copper extraction processes, by selecting and saving the leach water, which is sufficiently rich in value for subsequent treatment, and then treating the leach water so selected and saved by evaporation, thereby separating and recovering the valuable constituents.

The leach water or waste liquor from the copper extraction processes contains valuable constitutents in solution, such as zinc chlorid, sodium chlorid, sodium sulfate, iron chlorid and other substances. Its specific gravity may be assumed to be 16° Baumé and its volume may be assumed to be 25000 cubic feet. It is therefore evident that there is present a great deal of water in proportion to the value, and the volume of water is so great that hitherto the liquor has been wasted along with the value which it contained. For example, in such a liquor there is present 66/100 of a pound of zinc per cubic foot of water and the other valuable constituents are present in similar small proportions. Now I have discovered that the liquor from the first few leachings is so rich in value or concentrated that by evaporation it is possible to recover the values and these may be recovered separately by appropriate evaporation as is well known. For example, the liquor from the first leaching contains about four and one-half pounds of zinc per cubic foot and the other substances are present in increased quantity as compared with the liquor which is now wasted. The specific gravity of the liquor from the first leaching may be said to be about 32° Baumé, more or less. The specific gravity of the liquor from the second leaching is about 24° Baumé and it contains about one and three-quarter pounds of zinc per cubic foot and the other substances in generally similar proportions. It is therefore evident that by saving the liquor from the first of the series of leachings and subjecting such liquor to evaporation the valuable constituents of the liquor can be recovered and these constituents can be recovered separately. For example the sodium chlorid or common salt and sodium sulfate or Glauber salt can be first recovered and thereafter and separately the zinc chlorid and iron compound. The materials recovered possess known value in the state in which they are recovered but they can, of course, be converted into other states or conditions by well known methods and processes.

From the foregoing description it is evident that variations may be made in the details described to treat waste liquors from the different cinders or grom different works, but

Having thus described the nature and objects of my invention what I claim as new and desire to secure by Letters Patent is:

The process of recovering salts and copper values from cinders of the class described, which consists in leaching the cinders with sufficient liquor for the extraction of substantially all of the copper values therefrom, treating the first leachings which contain practically all the salts of value other than copper for the recovery of such salts in addition to the copper content, and treating the remaining leachings for the recovery of the copper content only.

In testimony whereof I have hereunto signed my name.

CLARENCE A. HALL.

Witnesses:
CLIFFORD K. CASSEL,
FRANK E. FRENCH.

Copies of this patent may be obtained for five cents each, by addressing the "Commissioner of Patents, Washington, D. C."